United States Patent
Savell

(10) Patent No.: US 8,954,174 B2
(45) Date of Patent: *Feb. 10, 2015

(54) METHOD AND DEVICE TO PROCESS DIGITAL MEDIA STREAMS

(75) Inventor: Thomas C. Savell, Santa Cruz, CA (US)

(73) Assignee: Creative Technology Ltd, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 12/430,867

(22) Filed: Apr. 27, 2009

(65) Prior Publication Data

US 2009/0228127 A1    Sep. 10, 2009

Related U.S. Application Data

(63) Continuation of application No. 10/636,087, filed on Aug. 6, 2003, now Pat. No. 7,526,350.

(51) Int. Cl.
*G06F 17/00* (2006.01)
*H04L 12/43* (2006.01)

(52) U.S. Cl.
CPC .................................... *H04L 12/43* (2013.01)
USPC .......................................................... 700/94

(58) Field of Classification Search
USPC ........................................... 700/94; 370/258
See application file for complete search history.

(56) References Cited

U.S. PATENT DOCUMENTS

| | | | |
|---|---|---|---|
| 3,959,594 A | 5/1976 | Srivastava | |
| 3,982,077 A * | 9/1976 | Clark et al. | 370/535 |
| 4,597,077 A | 6/1986 | Nelson et al. | |
| 4,736,333 A | 4/1988 | Mead et al. | |
| 4,757,469 A | 7/1988 | Odijk | |
| 4,817,083 A * | 3/1989 | Richards | 370/369 |
| 4,855,827 A | 8/1989 | Best | |
| 5,081,440 A | 1/1992 | Ott et al. | |
| 5,170,369 A | 12/1992 | Rossum | |
| 5,248,845 A | 9/1993 | Massie et al. | |
| 5,303,309 A | 4/1994 | Rossum | |
| 5,342,990 A | 8/1994 | Rossum | |
| 5,394,152 A | 2/1995 | Pieronek | |

(Continued)

FOREIGN PATENT DOCUMENTS

| | | |
|---|---|---|
| EP | 0184816 A2 | 6/1986 |
| EP | 212424 A2 | 3/1987 |

(Continued)

OTHER PUBLICATIONS

Oklobdzija, Vojin G., "The Computer Engineering Handbook", CRC Press, (2002), pp. 39-64.

(Continued)

*Primary Examiner* — Joseph Saunders, Jr.
(74) *Attorney, Agent, or Firm* — Russell Swerdon; Desmund Gean

(57) ABSTRACT

A digital processing circuit for processing media data includes a data path arranged to transmit at least media data along the data path between a plurality of processing modules connected serially. The data is transmitted directly from the output of a first module to an input of a second module of the plurality by sequential clocking signals. A routing controller controls transmission of data from the first of the plurality of processing modules to any target processing module selected from the plurality of modules by providing an identification for the target processing module in a signal provided on the datapath.

21 Claims, 7 Drawing Sheets

(56) References Cited

U.S. PATENT DOCUMENTS

| | | |
|---|---|---|
| 5,487,067 A | 1/1996 | Matsushige |
| 5,596,578 A | 1/1997 | Cunningham |
| 5,625,890 A | 4/1997 | Swift |
| 5,698,803 A | 12/1997 | Rossum |
| 5,698,807 A | 12/1997 | Massie et al. |
| 5,710,978 A | 1/1998 | Swift |
| 5,740,716 A | 4/1998 | Stilson |
| 5,763,800 A | 6/1998 | Rossum |
| 5,781,461 A | 7/1998 | Jaffe et al. |
| 5,802,385 A | 9/1998 | Densham et al. |
| 5,864,876 A | 1/1999 | Rossum et al. |
| 5,878,265 A | 3/1999 | Hartmann |
| 5,918,302 A | 6/1999 | Rinn |
| 5,928,342 A | 7/1999 | Rossum et al. |
| 6,032,235 A | 2/2000 | Hoge |
| 6,266,797 B1 | 7/2001 | Godfrey et al. |
| 6,275,899 B1 | 8/2001 | Savell et al. |
| 6,560,240 B1 | 5/2003 | Borland et al. |
| 6,611,537 B1 | 8/2003 | Edens et al. |
| 6,724,772 B1 * | 4/2004 | Borland et al. ............. 370/442 |
| 7,113,488 B2 | 9/2006 | Jenkins et al. |
| 2001/0038613 A1 * | 11/2001 | Gray ........................ 370/258 |
| 2002/0000831 A1 * | 1/2002 | Smith ........................ 326/39 |
| 2003/0081594 A1 | 5/2003 | Lee |
| 2003/0225951 A1 * | 12/2003 | Knapp et al. ................ 710/105 |

FOREIGN PATENT DOCUMENTS

| | | |
|---|---|---|
| EP | 0887744 A2 | 12/1998 |
| EP | 1327939 A2 | 7/2003 |
| GB | 2049365 A | 12/1980 |
| GB | 2064918 A | 6/1981 |
| GB | 2111803 A | 10/1982 |
| GB | 2213027 A | 8/1989 |
| GB | 2265049 | 9/1993 |
| GB | 2265059 | 9/1993 |
| GB | 2265069 | 9/1993 |
| GB | 2347009 | 8/2000 |
| GB | 2377138 | 12/2002 |
| GB | 2404762 | 2/2005 |
| JP | 57141768 | 9/1982 |
| WO | 80/01008 A1 | 5/1980 |
| WO | 01/08366 A1 | 2/2001 |
| WO | 0108366 A1 | 2/2001 |
| WO | 03005152 | 1/2003 |

OTHER PUBLICATIONS

Savell, Thomas C., "The EMU10K1 Digital Audio Processor". IEEE, (1999), pp. 2-10.

"ASTi Application Note", http://www.asti-usa.com/support/appnotes/09.html, (Jun. 27, 2002), 4 pages.

"Search Report for GB 9304978.1", (May 11, 1993), 2pgs.

"Search Report for SG 200404288-3", (Apr. 7, 2005), 9pgs.

"Search Report for Great Britain Application No. 0417604.6", (Dec. 2, 2004).

Cota, E., et al. "The Impact of NoC Reuse on the Testing of Core-Based Systems", VLSI Test Symposium 2003, Proceedings, (Apr. 27, 2003), 128-133.

Kangas, T., "TDMA-based communication scheduling in system-on-chip video encoder", IEEE International Symposium on Circuits and Systems, ISCAS 2002., (May 26-29, 2002). 369-372.

Lahtinen, V., "Interconnection scheme for continuous-media systems-on-a-chip", Microprocessors and microsystems, 26(3), (Apr. 6, 2002), 123-138.

Poletti, F., et al., "Performance Analysis of Arbitration Policies for SoC Communication Architectures", Design Automation for Embedded System, 8, (Jun. 2003), 189-210.

"International Application Serial No. SE 2007 04027A, Written Opinion mailed Dec. 19, 2007", 9pgs.

* cited by examiner

METHOD AND DEVICE TO PROCESS DIGITAL MEDIA STREAMS

This application is a continuation of co-pending U.S. patent application Ser. No. 10/636,087, entitled "METHOD AND DEVICE TO PROCESS DIGITAL MEDIA STREAMS", filed Aug. 6, 2003, priority to which is claimed and which is herein incorporated by reference for all purposes.

FIELD OF THE INVENTION

The present invention relates generally to the field of processing digital media data. More specifically, the invention relates to a method to communicate media data between a plurality of processing modules and to a digital processing device to process media data.

BACKGROUND OF THE INVENTION

Conventional audio processing devices use a fixed and predetermined (hardwired) configuration to interconnect various processing components such as filter components, delay components, sample rate converters (SRC), and a Digital Signal Processor (DSP). However, such a configuration may result in the inability to perform certain algorithms that require connecting the processing components in a different fashion than the hardwired configuration allows. It may also create communication "bottlenecks" as the various processing components can only communicate with each other via the DSP, if they can communicate at all. The DSP thus functions as a hub through which all data is communicated even if the DSP is not required to process the data. Additionally, a hardwired configuration often results in wasted processing power, since a signal always passes through a particular processing component even if the algorithm does not require that component. And if an algorithm requires more processing elements than the hardwired configuration provides, the algorithm cannot be performed. It will thus be appreciated that such a configuration may inhibit device performance.

SUMMARY OF THE INVENTION

In accordance with the invention, there is provided a digital processing device and method to process media data, the device including:
- a plurality of processing modules to process the media data; and
- a data path to communicate data between the processing modules, wherein the data path is arranged in a ring configuration.

The invention extends to a machine-readable medium embodying a sequence of instructions that, when executed by a machine, cause the machine to carry out any of the methods described herein.

Other features of the present invention will be apparent from the accompanying drawings and from the detailed description that follows.

BRIEF DESCRIPTION OF THE DRAWINGS

The invention is now described, by way of example, with reference to the accompanying diagrammatic drawings. In the drawings.

DETAILED DESCRIPTION

Figure 1:
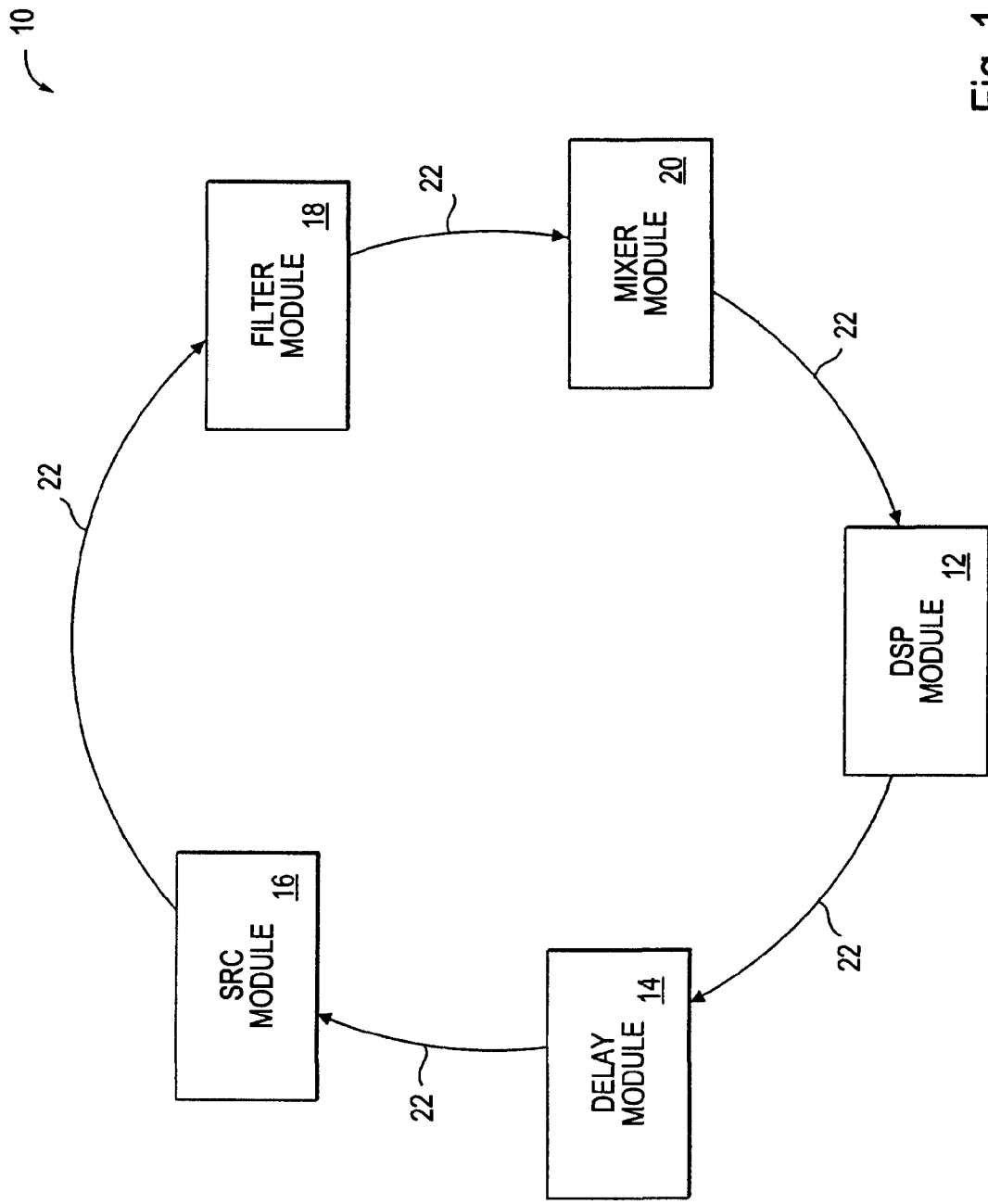
FIG. 1 shows a schematic block diagram of an exemplary digital processing device, in accordance with one embodiment of the invention, including a data path arranged in a ring configuration.

A method and device to process digital media data, is described. In the following description, for purposes of explanation, numerous specific details are set forth in order to provide a thorough understanding of the present invention. It will be evident, however, to one skilled in the art that the present invention may be practiced without these specific details.

Referring to the drawings, reference numeral 10 generally indicates a schematic block diagram of an exemplary digital processing device in accordance with the invention. The device 10 is shown to include a plurality of processing modules, namely, a digital signal processing (DSP) module 12, a delay module 14, a sample rate converter (SRC) module 16, a filter module 18, and a mixer module 20. The modules 12 to 20 are interconnected serially via a data path 22 which is arranged in a ring configuration wherein data is sequentially communicated from any one processing module to any other processing module. Unlike conventional digital processing devices, the device 10 in accordance to the invention allows each module 12 to 20 to communicate data with any other module 12 to 20 connected to the data path 22 as described in more detail below. In one embodiment of the invention, the data path 22 is time division multiplexed wherein a routing controller controls communication of data between the various modules 12 to 20. Further, it is to be appreciated, that the modules 12 to 20 are merely exemplary modules and further modules (with the same or differing processing capabilities) may be included in the device 10 and/or any one or more of the modules 20 may be removed and, for example, included within any other module 12 to 20.

Thus, in one embodiment, any one of the modules 12 to 20 may communicate data to any one or more of the other modules 12 to 20 under control of a routing controller. Accordingly, data being processed by the digital processing device 10 may be flexibly routed between different modules 12 to 20 and need be not restricted to predetermined pathways as in the case of conventional devices. It will be appreciated that a module 12 to 20 and 34 may also communicate data back to itself via the audio bus 46. Accordingly, repeated processing may be performed on the data by the same processing module. The processing module 12 to 20 that provides the data to the data path 22 may be viewed as a source processing module, and the particular processing module 12 to 22 that is to process the data may be viewed as a target or destination processing module. As a processing module 12 to 20 may return processed data to itself, in one mode of operation a processing module 12 to 20 may define both the source and destination processing module. Thus, for example, the filter module 18 may form a cascaded filter arrangement where its output or processed data may be sent back to itself for further processing prior to being sent to another processing module 12 to 20 and 34.

Although, the invention is described with reference to processing a digital media stream in the form of a digital audio stream, it is however to be appreciated that the invention may be applied to the processing of any other digital media streams, for example, digital video streams or the like.

Figure 2:
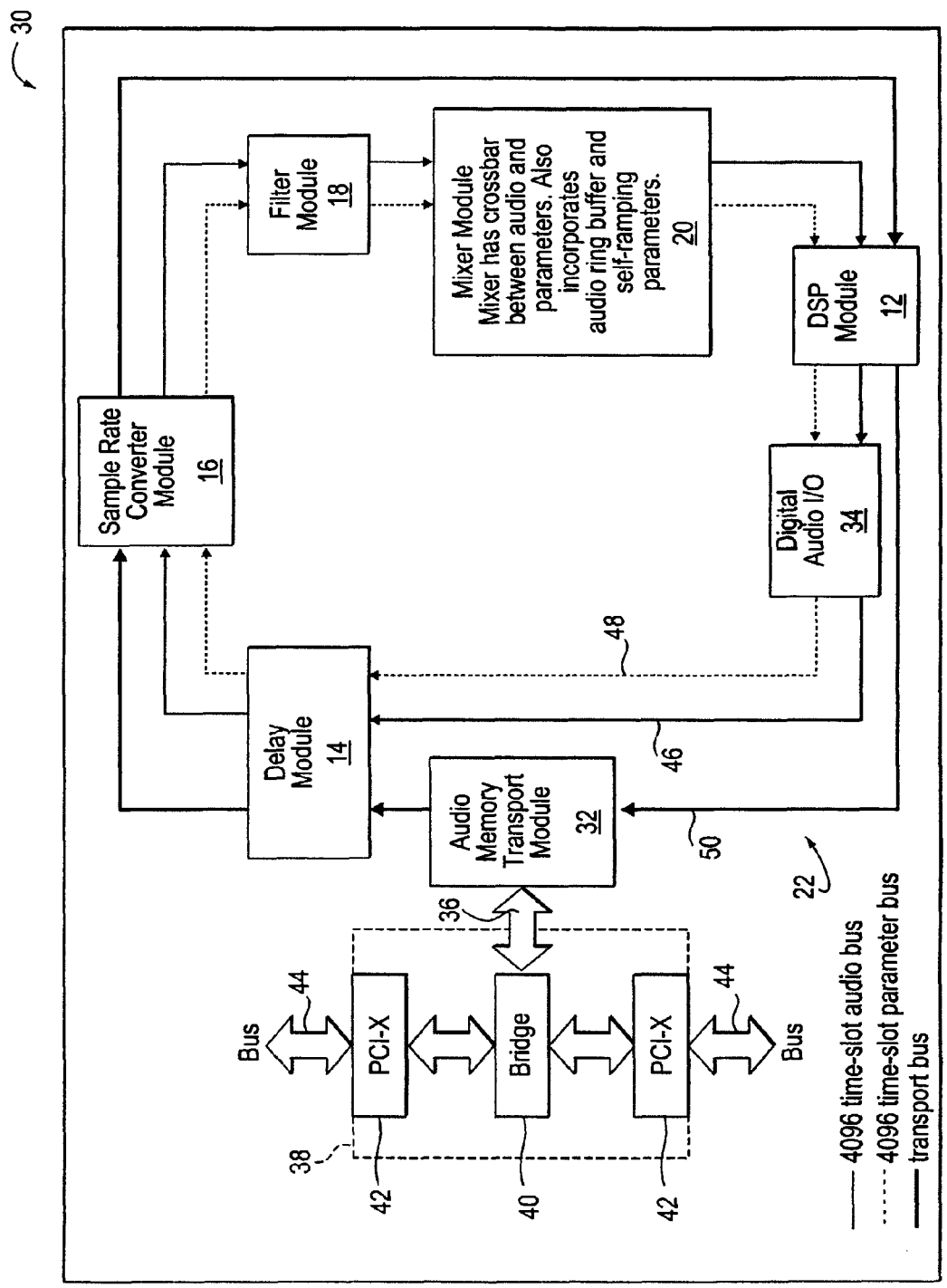
FIG. 2 shows a schematic block diagram of a further embodiment of a digital processing device, also in accordance with the invention.

Referring in particular to FIG. 2 of the drawings, reference numeral 30 generally indicates a digital processing device in accordance with a further embodiment of the invention. The device 30 resembles the device 10 and, accordingly, like reference numerals have been used to indicate the same or similar feature unless otherwise indicated.

The device 30 includes a DSP module 12, a delay module 14, a sample rate converter (SRC) module 16, a filter module 18, and a mixer module 20 that are substantially similar to the modules described herein before. Further, the device 30 includes an audio memory transport module 32 and a digital audio input output (I/O) module 34. The audio memory transport module 32 communicates via a bus 36 with an interface module 38 which, for example, may form part of a bus of a computer device (for example a personal computer or PC). In one embodiment, the interface module 38 includes a bridge 40 and two PCI-X bus interfaces 42 that interface the bridge 40 to a conventional PC bus 44. The digital I/O module 34 may receive a digital audio input and provide digital audio output to an output device. As in the case of the device 10, the device 30 includes a data path 22 which serially interconnects the modules 12, 34, 32 and 14 to 20.

The data path 22 of the device 30 includes a media data path in the exemplary form of an audio data path or audio bus 46, and a processing control path in the exemplary form of a parameter bus 48. In one embodiment, both the audio bus 46 and the parameter bus 48 are arranged in a ring configuration wherein data is communicated between the various processing modules 12 to 20, 32, 34 in a time division multiplexed fashion. As the various modules are located along the audio bus 46, audio data may be routed between modules without requiring the data to be routed through a central hub (e.g., a DSP). In certain embodiments, the device 30 includes a transport bus 50 which interfaces an external computer via the interface module 38 and the audio memory transport module 32 to the processing modules 12 to 20.

In order to control the routing of data on the data path 22 (including, for example, the audio bus 46, the parameter bus 48 and the transport bus 50) the device 30, in certain embodiments, includes a routing controller 52 (see FIG. 3) which controls the routing of data along the data path 22. In particular, as generally indicated by reference numeral 54, in one embodiment the routing controller 52 controls the routing of data to each processing module 12 to 20, 32, 34 via chip select lines 56 and address, write data, and write enable lines 58. Each module 12 to 20, 32, 34 communicates data to the routing controller 52 via read data and acknowledge lines 60. In one embodiment, the routing controller 52 defines a host interface that uses a full synchronous hand-shake approach that interfaces the various processing modules 12 to 20, 32, 34 of the device 30. For example, the routing controller 52 may generate a chip select that is held active until an acknowledge signal is received from a selected processing module 12 to 20, 32, 34. In one embodiment, the routing controller 52 decodes the most significant bits of a host address and, in response thereto, generates a chip select that enables the selected processing module 12 to 20, 32, 34. As described in more detail below, each module 12 to 20, 32, 34 may locally decode the remaining least significant bits of the hosts address that are significant thereby to identify the specific module 12 to 20, 32, 34 to which data is to be routed.

Figure 3:
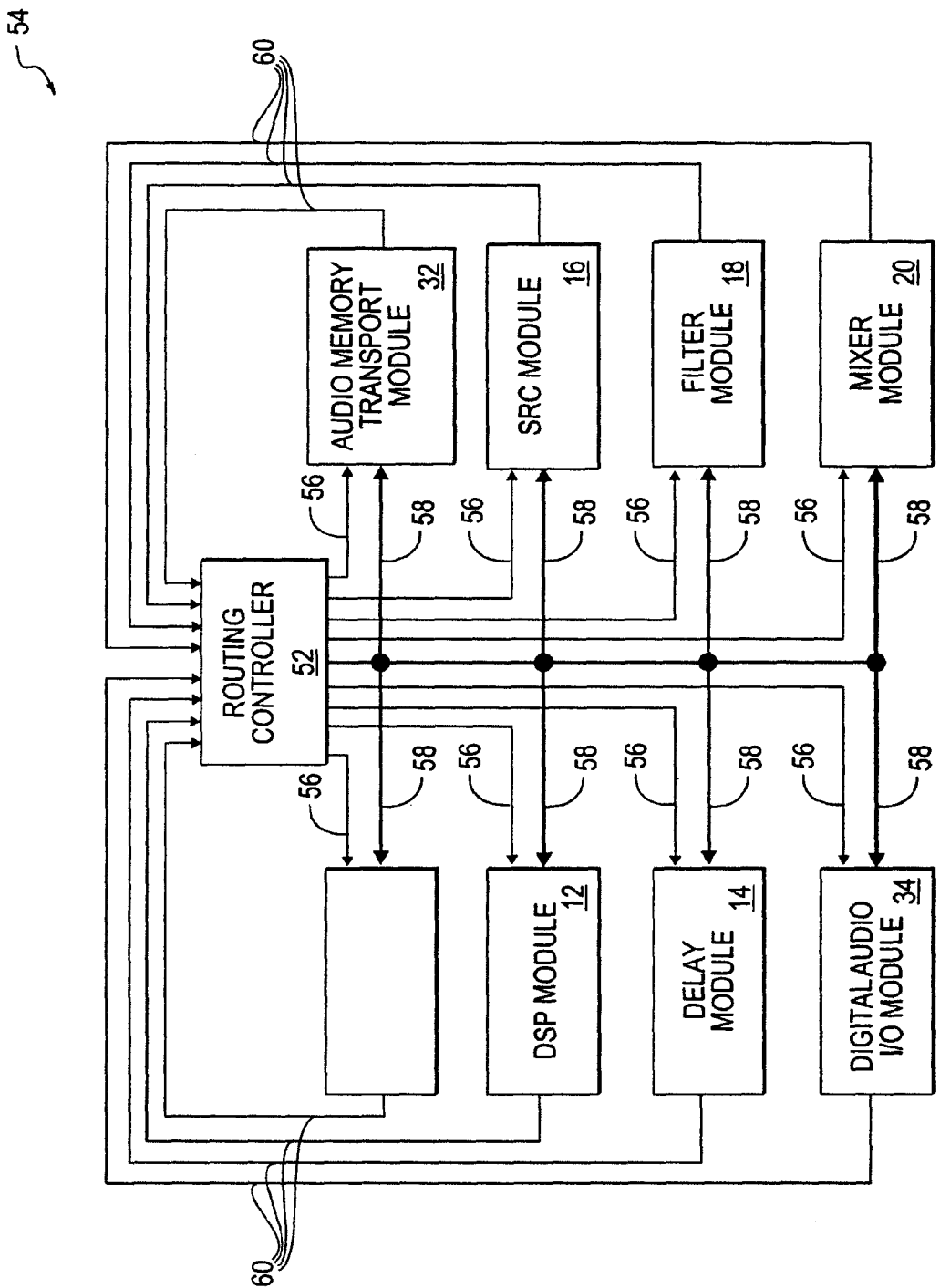
FIG. 3 shows a schematic block diagram of a routing controller, in accordance with an embodiment of the invention, for routing digital data in the digital processing device of FIG. 2.

The exemplary routing controller 52 of FIG. 3 uses a common data bus 58 to provide address, write data and write enable data to all of the processing modules 12 to 20, 32, 34. However, each module 12 to 20, 32, 34 includes a dedicated read data and acknowledge bus 60 for reading data and providing acknowledgements to the routing controller 52.

Figure 4:
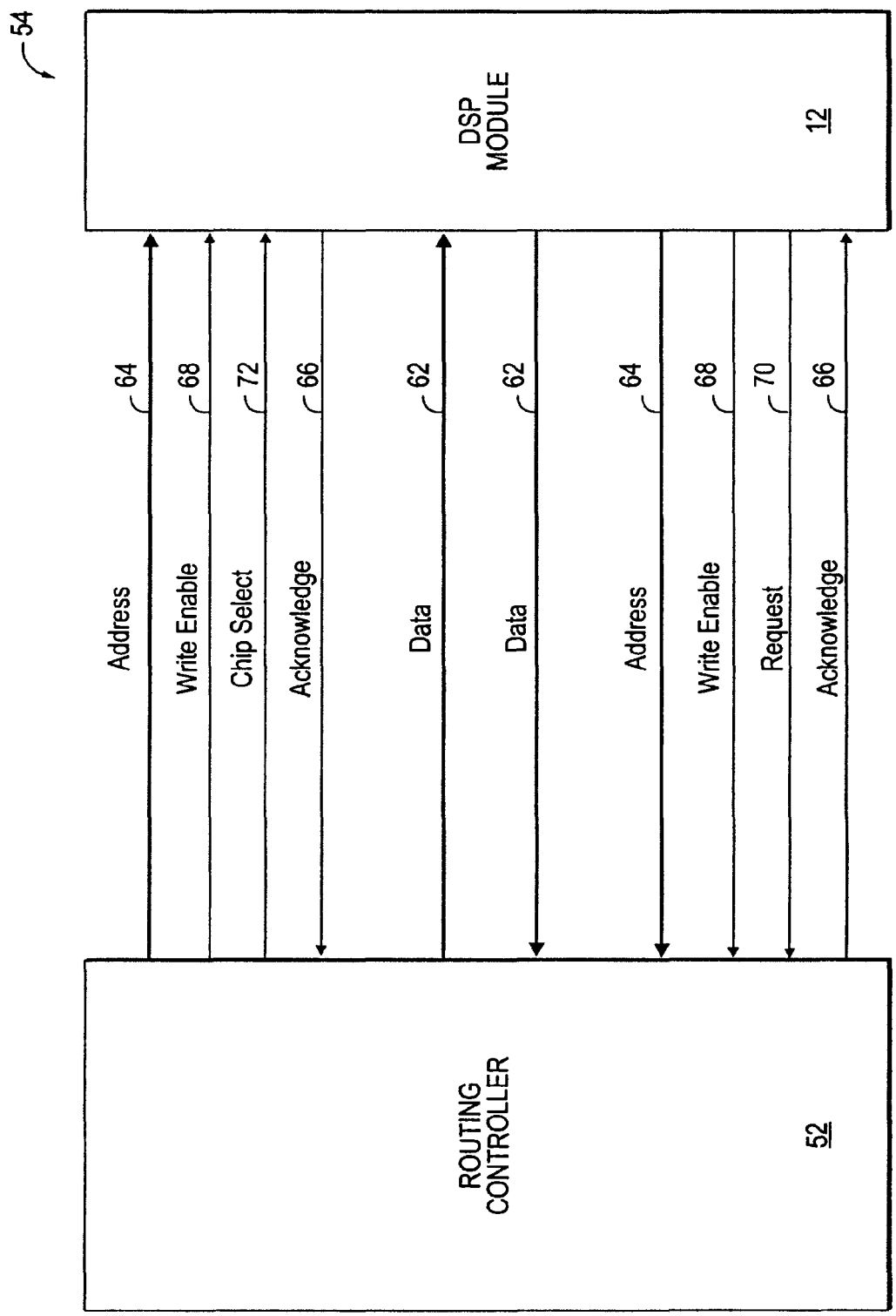
FIG. 4 shows a schematic block diagram of an exemplary interface between a routing controller and a digital signal processor (DSP) of the digital processing device.

In one embodiment of the invention, the DSP module 12 is interfaced to the routing controller 52 in such a fashion so that the DSP module 12 has access to registers and random access memory (RAM) provided in each of the modules 14 to 20, 32, 34. In particular, as shown in FIG. 4, the DSP module 12 may communicate with the routing controller 52 via a data bus 62, an address bus 64, acknowledge lines 66, write enable lines 68, a request line 70 and a chip select line 72. In order to access registers and RAM that may be provided in the modules 14 to 20, 32, 34, the DSP module 12 communicates a request via line 70 to the routing controller 52. The routing controller 52 may then acknowledge the request via the acknowledge line 66 where after the requested functionality may be executed using the address bus 64 and data bus 62.

In embodiments in which a sample rate tracker is provided within the digital audio I/O module 34, it may also be interfaced to the routing controller 52 thereby providing access to registers and/or RAM in the modules 12 to 20, 32. In one embodiment, the routing controller 52 treats requests from the DSP module 12 (and one or more sample rate trackers if provided) as equivalent to host processor accesses using a first come first served priority scheme. However, if the requests arrive at the same time, the requests may be sorted. For example, the routing controller 52 may first route requests to the DSP module 12, then to the sample rate trackers provided in the digital audio I/O module 34 and, finally, to a host processor. In one embodiment, the device 30 has two base address registers, one mapped to I/O and the other mapped to memory. Both of these registers may be active simultaneously and, both address registers may allow access to the same internal registers and memories of a chip on which the device 30 is provided.

In one embodiment of the invention, the audio bus 46 provides audio channels that are time division multiplexed. Each processing module 12 to 20, 32, 34 may have a fixed output time-slot allocated to it and a programmable or variable input time-slot. Thus, in this embodiment, the modules 12 to 20, 32, 34 may always output data in the same predetermined time-slot to the audio bus 46 but receive data in different time-slots under control of the routing controller 52. Thus, as the input time-slot associated with each individual module 12 to 20, 32, 34 is programmable, data may be routed between the various modules 12 to 20, 32, 34 in a flexible fashion. As described in more detail below, a channel identification bus may be provided to identify the module 12 to 20, 32, 34 with which the time-slot is associated. In one embodiment, the channel identification bus identifies a source processing module 12 to 20, 32,34 and a target or destination processing module 12 to 20, 32, 34 includes a list to identify data sources from which data is to be processed. However, it will be appreciated that the channel identification may also identify a target processing module 12 to 20, 32, 34.

In certain embodiments, the device 30 allows digital data (e.g., digital audio data) to be communicated along the audio bus 46 at differing sample rates (e.g., sample rates set by the DSP module 12). For example, in one embodiment of the invention, 4096 buffer channels or time-slots are provided on the audio bus 46. In this exemplary configuration, the audio bus 46 may then support sample rates of up to 384 kHz by allocating one time-slot for 48 kHz, two time-slots for 96 kHz, four time-slots for 192 kHz, and eight time-slots for 384 kHz. Thus, since there are 4096 total channels or time-slots in the given sample, only 2048 channels or time-slots are available at 96 kHz, 1024 time-slots available at 192 kHz, and 512 time-slots are available at 384 kHz. It is, however, to be appreciated that the number of time-slots for each sample rate at any given time during operation of the device 30 may vary and, for example, situations could arise where, for example, 3348 48 kHz time-slots are provided, 204 96 kHz time-slots are provided, and 85 192 kHz time-slots may be provided. However, the various configurations (e.g., bit-rates) or numbers of time-slots may vary depending upon the functionality to be executed by the device 30. For example, in other embodiments programmable operating clock frequencies may be provided. For example, clock frequencies of 150 MHz, 175 MHz, and 200 MHz may be provided that correspond to 3072, 3584, and 4096 time-slots respectively. It is, however, to be appreciated that these are merely examples of frequencies and time-slots and that they may change from embodiment to embodiment. Thus, in one embodiment, the media data path may include a total number of time-slots for communicating media data at a plurality of different bit rates wherein the sum of a number of time-slots allocated to each one of the plurality of bit rates equals the total number of time-slots.

In certain embodiments, arbitrary sample rates, such as the CD standard of 44.1 kHz, may be communicated or routed via the audio bus 46 using a indicator bit (e.g. a valid bit) that indicates to a receiving module 12 to 20, 32, 34 that a new valid sample is to be retrieved or extracted from the audio bus 46 for processing. When an arbitrary sample rate (such as the 44.1 kHz sample rate) is communicated via the audio bus 46, and the exemplary valid bit is high, the respective module 12 to 20, 32, 34 may accept the data as valid. Whereas, when the valid bit goes low, the module 12 to 20, 32, 34 is thereby informed that the subsequent samples may be disregarded.

Although in one embodiment variable sample rates may be communicated via the audio bus 46, the parameter bus 48 may communicate control data at a fixed sample rate (e.g. 48 kHz) that may be independent of the sample rate of the audio bus 46.

In one embodiment, the audio bus 46 communicates audio data to be processed by the various modules 12 to 20, 32, 34. However, the parameter bus 48 includes parameter or processing data which is used by an associated module 12 to 20, 32, 34 to define the functionality (e.g., algorithm) of the associated module 12 to 20, 32, 34. Accordingly, the control data may thus control how the data on the audio bus 46 will be processed by the particular module 12 to 20, 32, 34. For example, the parameter bus 48 may be used to communicate filter parameters to the filter module 18, sample rate conversion parameters to the sample rate converter module 16, delay data to the module 14 that defines the period by which the digital audio will be delayed, and so on. It will thus be appreciated that, in order to reduce any processing latencies in the device 30, the parameter data should be provided to each of the processing modules 12 to 20, 32, 34 prior to the time slot which each particular processing module 12 to 20, 32, 34 is to output processed audio data. Accordingly, as described in more detail below, parameter data is communicated via the parameter bus 48 to a particular processing module 12 to 20, 32, 34 prior to the audio data arriving at the processing module 12 to 20, 32, 34 via the audio bus 46.

In one embodiment of the invention, audio data communicated via the audio bus 46 is in 32-bit IEEE floating-point format (single precision). Any module placed on the data path 22 that operates in a fixed-point format (e.g., fixed-point audio) may thus be required to perform a conversion to and from floating-point format. As the fixed-point format is defined to be in a range of −1 to +1, any hardware conversion of the fixed-point format will saturate floating-point values that lie outside this range. Accordingly, the mixer module 20 may be used to scale any digital data that is placed on the data path 22 for any processing module that performs fixed-point conversion so that the conversion lies within the range of −1 to +1. For example, in one embodiment of the invention, the sample rate converter module 16 and the digital audio I/O module 34 may process data in a fixed-point format and, accordingly, scaling may then be required by the mixer module 20.

Figure 5:
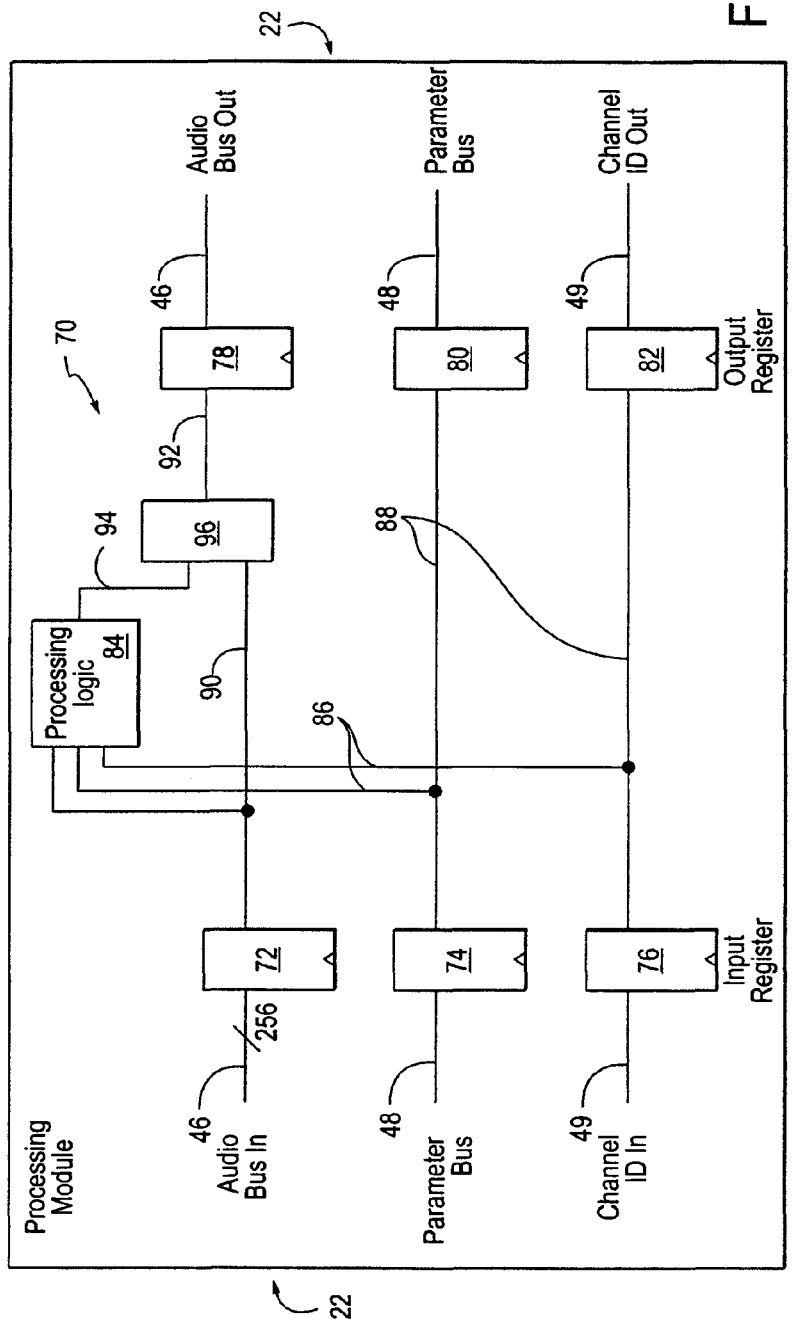
FIG. 5 shows a schematic block diagram of a processing module interface, according to an embodiment of the invention.

Referring in particular to FIG. 5, reference numeral 70 generally indicates an exemplary data path interface provided in each processing module 12 to 20, 32, 34. It will also be appreciated that the data path interface 70 may be provided in any further processing modules that may be added in a modular fashion to the device 30 to communicate via the data path 22. When the data path 22 includes a media data path in the form of the audio bus 46, a processing control path in the form of the parameter bus 48, and a channel identification bus 49, the interface 70 may include input registers 72, 74, 76 which clock all inputs on the data path 22 into the respective processing module 12 to 20, 32, 34 for processing. In a similar fashion, output registers 78, 80, 82 clock data back onto the data path 22. Dedicated processing logic 84 is provided in each processing module 12 to 20, 32, 34 to process the digital data, received via the audio bus 46, in accordance with the parameters received via the parameter bus 48. The functionality of the processing logic 84 differs from module to module. For example, the processing logic in the filter module 18 may define a plurality of filters (e.g., IIR and FIR filters), the processing logic 84 in the sample rate converter module 16 may define a sample rate converter, and so on.

In the embodiment depicted in the drawings, the channel identification data included in the channel identification bus 49, and the parameter data provided by the parameter bus 48, is read by the processing logic 84 as shown by lines 86 and passed on or returned to the channel identification bus 49 and the parameter bus 48, respectively, two clock cycles later (as shown by lines 88). However, audio data provided by the audio bus 46 may be either passed directly on to the audio bus 46 (as shown by lines 90, 92) or be replaced with processed audio data from the processing logic 84 (as shown by lines 94 and 92). Accordingly, the data path interface 70 may include a multiplexer 96 that selects between the data received via the audio bus 46 and the processed data received from the processes logic 84. Thus, when a particular processing module 12 to 20, 32, 34 is not the target processing module 12 to 20, 32, 34 and it receives data, the processing module 12 to 20, 32, 34 may merely pass the data along the communicating ring to the next processing module 12 to 20, 32, 34. Accordingly, the data may be passed on sequentially until it reaches the target processing module 12 to 20, 32, 34. It will be appreciated that the data passed along may form part of a stream of media data that is being processed. Likewise, streams of processing control data may be passed along the parameter bus 48.

Figure 6:
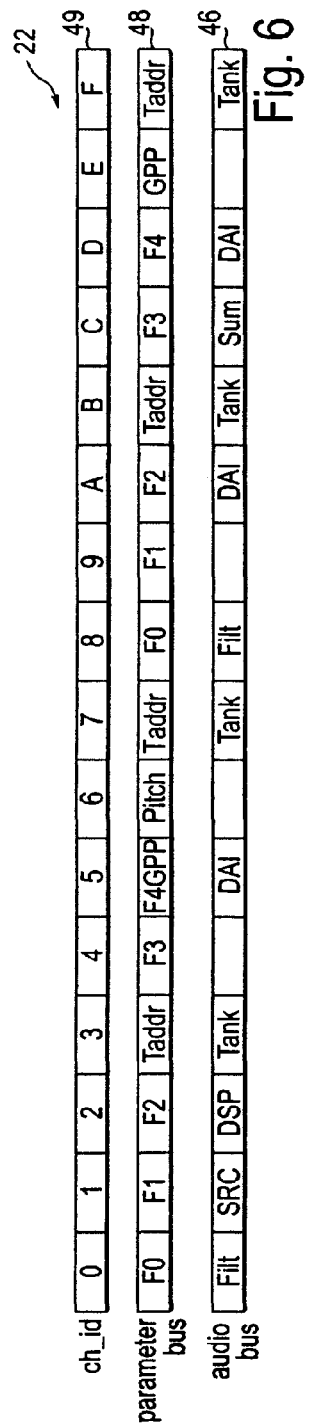
FIG. 6 shows an exemplary time-slot location arrangement of the data path of FIG. 2.

Referring in particular to FIG. 6, an exemplary configuration of the data path 22 is shown. As mentioned above, in one embodiment, the data path 22 includes the audio bus 46, the parameter bus 48, and the channel identification bus 49. The channel identification bus 49 may include channel identifiers that identify both the channels or time-slots provided on the parameter bus 48 and the channels or time-slots provided on the audio bus 46. However, it is to be appreciated, that separate channel identifiers may be provided for the audio bus 46 and the parameter bus 48. For example, embodiments may be provided wherein the audio bus 46 and the parameter bus 48 each have their own channel identification bus. In one embodiment of the invention, each channel identifier is in the form of a hexadecimal number generated by a counter which has its count included in the channel identification bus 49.

Exemplary parameter definitions provided on the parameter bus 48 (see FIG. 6) are as follows:
  $F_x$=filter parameters 0 to 4 for the filter module 18;
  Pitch=pitch of the sample rate converter module 16;
  GPP=general purpose parameters to be used by the modules 12 to 20, 32, 34; and
  Taddr=delay line address of the delay module 14.

Exemplary audio channel or time-slot definitions are as follows: FILT outputs from the filter module 18 (e.g., of an IIR filter);
  DSP=outputs of the DSP module 12;
  SRC=outputs of the sample rate converter module 16;
  SUM=summation node outputs of the mixer module 20;
  DAI=digital audio inputs from the I/O module 34; and
  Tank=data outputs from the delay module 14.

In one embodiment of the invention, as mentioned above, the least significant two, three, or four bits of the channel identification data may be used to identify the specific processing module 12 to 20, 32, 34 associated with a particular time-slot and, accordingly thus identify the particular time-slot (or time-slots) that the processing module 12 to 20, 32, 34 owns. However, the most significant bits may be used to identify a logical channel or time-slot within the particular processing module. For example, a filter module that can process 512 discrete channels of audio implements a plurality of 512 discrete filter channels, each requiring its own set of filter parameters, and each providing its own discrete filtered audio output. In an embodiment of the invention that contains such a filter module, the most significant 9 bits of the channel identification data may determine to which filter channel the filter parameters belong, and which filter channel generated the audio.

In one embodiment of the invention, the channel identification data provided via the channel identification bus 49 is generated in the mixer module 20. As mentioned above, the channel identification data may define a channel identifier that may be generated by a counter that runs from 0 to 4095 wherein each number identifies, or is associated with, a particular channel or time-slot. Further, as mentioned above, in order to ensure that parameters arrive at the appropriate processing module 12 to 20, 32, 34 prior to the time-slot in which they are to output processed audio data, the data on the parameter bus 48 may be offset relative to data provided on the audio bus 46.

In one embodiment of the invention, software may program the mixer module 20. The software may then take into account that a module 12 to 20, 32, 34 requires a certain amount of time to operate on incoming parameters (via the parameter bus 48) and to generate the processed audio data which it then outputs on the audio bus 46. In these embodiments, the appropriate parameters for the processing module 12 to 20, 32, 34 are provided in a time-slot that precedes the time-slot in which the module outputs the audio data on audio bus 46. As different processing modules 12 to 20, 32, 34 may require different parameters and times to process the parameters and audio, parameters associated with different processing modules 12 to 20, 32, 34 may be offset by a differing number of time-slots. For example, an exemplary offset of 96 may be provided for the sample rate converter module 16, an exemplary parameter offset of 40 may be provided for the filter module 18, and an exemplary parameter offset of 20 may be provided to the delay module 14. It is, however, to be appreciated that the offsets may differ from embodiment to embodiment and also differ in a single embodiment depending on the functionality or algorithm that the modules 12 to 20, 32, 34 are to perform or execute.

In certain embodiments, it is necessary to buffer the audio data received via the audio bus 46. In particular, phase coherency is a requirement for multi-channel audio data to avoid phase cancellation and image shifting. Phase coherency is simplified by buffering a full sample period of audio data. A processing module may then process guaranteed phase coherent audio from its local audio buffer without respect to the relative intra-sample timing of data arrival and data processing. It may not be necessary to buffer all channels received via audio bus 46, only those that are to be processed. To implement phase coherency, a ping-pong buffer scheme can be used in which at least two buffers, "A" and B", alternate in usage from write to read. During the first sample period, the received audio data may be written to buffer "A" while the processing module reads from buffer "B". At a certain time, the buffers may swap functions so that during the next sample period, the received audio data is written to buffer "B" while the processing module reads from buffer "A". In certain embodiments, the delay module 14, the filter module 18, and the mixer module 20 may change or swap audio buffers synchronized with their respective channel processing times. For example, data path or audio ring input buffers of the delay module 14 may swap when the delay module 14 channel equals zero, e.g., when the delay module 14 begins to generate the audio it will output to the audio bus 46 when the most significant bits of the channel identification are equal to zero. This may occur when the data path or audio ring channel or time-slot equals the maximum channel identification minus the parameter offset of the delay module 14. If the parameter offset is equal to 20, this delays the last 20 audio ring channels or time-slots by an extra sample period relative to the other ring channels or time-slots from the perspective of the delay module 14. Likewise, in the case of the filter module 18, the last 40 audio ring channels or time-slots may be delayed by an extra sample period to the filter module 18. In certain embodiments, the mixer module 20 may delay the last 18 audio ring channels or time-slots. However, in one embodiment, the sample rate converter module 16 may write audio ring data directly into its channel caches and, accordingly, relative delay problems may not be experienced.

As mentioned above, output time-slots (time-slots in which each processing module 12 to 20, 32, 34 outputs data onto the audio bus 46) are dedicated time-slots. However, in certain embodiments, the time-slots in which data is communicated to any one of the processing modules 12 to 20, 32, 34 is programmable and, thus, the channel identification data identifies the particular processing module 12 to 20, 32, 34 that is to process the audio data on the audio bus 46. In one embodiment, the parameter bus 48 has its input time-slots allocated. Further, in certain embodiments, the mixer module 20 may provide the parameters that are communicated to the various processing modules 12 to 20, 32, 34 via the parameter bus 48. Accordingly, not only can data be flexibly routed from any one of the processing modules 12 to 20, 32, 34 to any other one or more processing modules 12 to 20, 32, 34 but, in a similar fashion, parameters may be flexibly routed to any of the processing modules 12 to 20, 32, 34. In one embodiment of the invention, the DSP module 12 can overwrite parameters on the parameters bus 48 thereby allowing the DSP module 12 direct control of the functionality executed or performed by the delay module 14, the sample rate converter module 16, the filter module 18, and the mixer module 20 (or any other modules added to the data path 22).

Figure 7:
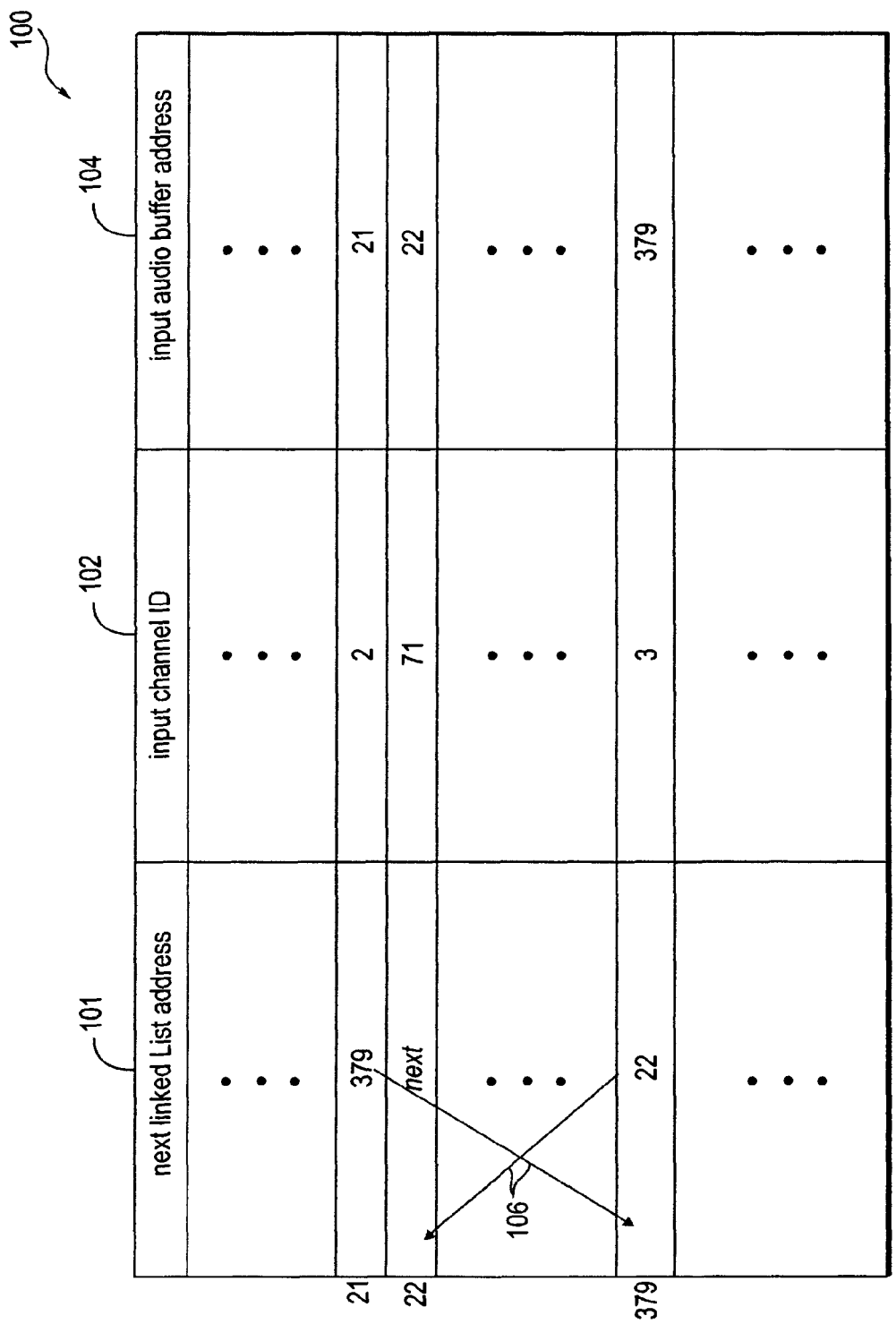
FIG. 7 shows an exemplary linked list of an input mapper.

As mentioned above, data included in the audio bus 46 and parameters included in the parameter bus 48 may be flexibly routed to the processing modules 12 to 20, 32, 34. In one embodiment of the invention, an input mapper in the form of a linked list 100 (see FIG. 7) is provided. In this embodiment, the routing controller 52 (see FIG. 3) performs programmable input mapping to flexibly route audio data to the various processing modules 12 to 20, 32, 34. In use, the input mapper may traverse a linked list 100 of input channel identifiers 102 and input RAM addresses 104 to determine which input channels are written to which addresses within the input audio buffer. In one embodiment of the invention, the linked list 100 is used and the list is arranged or sorted in an order of ascending channel identifiers regardless of the input audio buffer address, as shown by arrows 106. A host software driver may maintain the list 100.

The input mapper may, in use, load the first element in the linked list 100 which may include the input channel identifier 102, the input audio buffer address 104 and appoint it to the next element in the list. The input mapper then waits until the input channel identifier on the channel identification bus 49 matches the input channel identification field 102 and then writes the input audio data received via audio bus 46 to the designated input audio buffer address. The element of the linked list 100 designated by the next linked list address field 101 may then be loaded and the operation may be repeated. The linked list 100 may be maintained in a circular fashion so its last element points to its first element of the linked list 100. On reset, for example, a default input mapping list may be automatically written by hardware initialization logic and host driver software may merely be required to maintain the linked list 100. If multiple filters are provided by the filter module 18, an additional level of mapping may be provided to support multiple filters operating on the same input signal or data provided via the audio bus 46.

Figure 8:
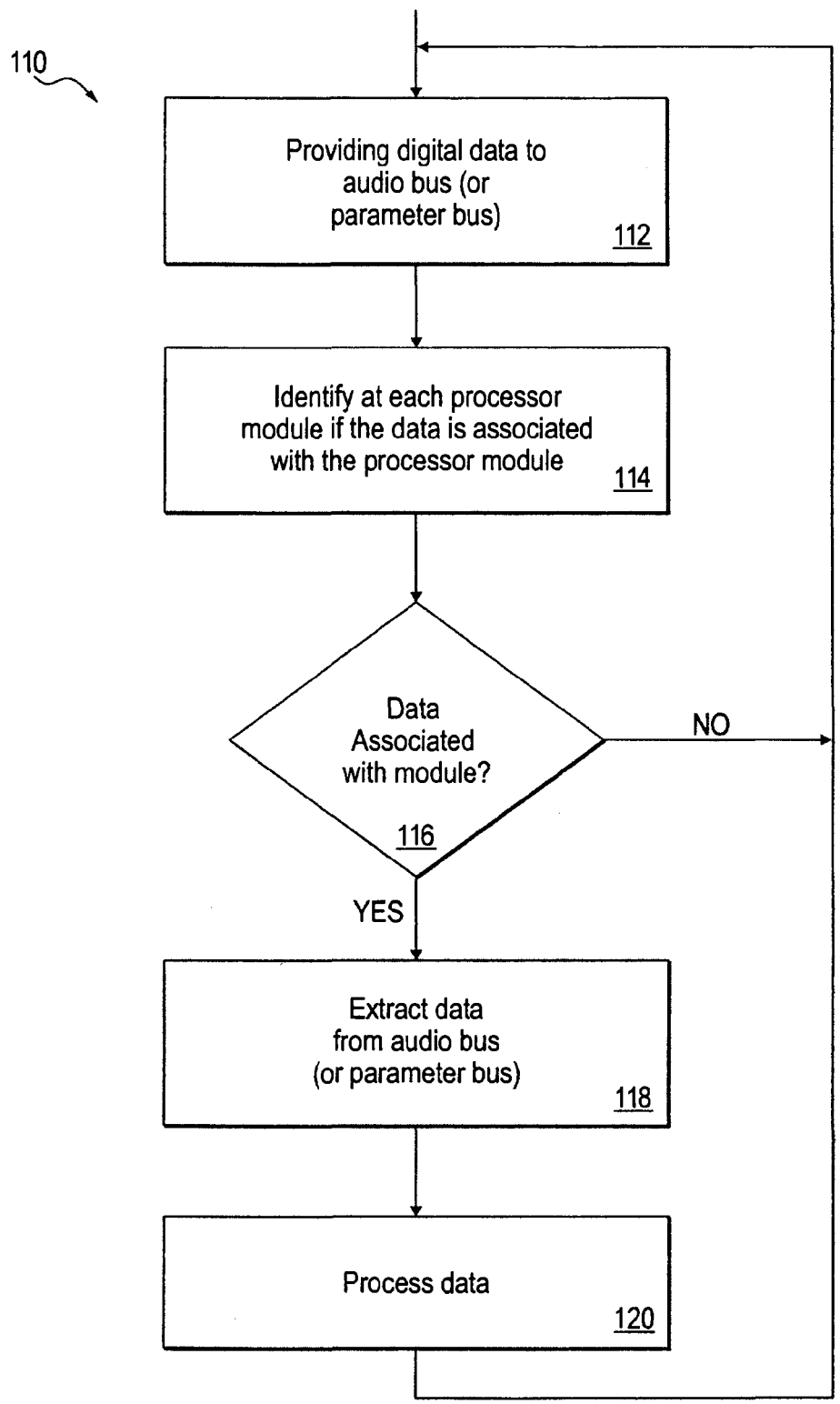
FIG. 8 shows a schematic flow diagram of a method, in accordance with the invention, for communicating data in a digital processing device.

The methodology described above is broadly summarized in FIG. 8 of the drawings. Reference numeral 110 generally indicates a method of communicating digital media data (e.g., digital audio data) in a digital media processing device such as a digital audio processing device. As shown at block 112, digital data is provided on the data path 22. Each particular processor module 12 to 20, 32, 34 then identifies if the data is associated with the particular processor module 12 to 20, 32, 34 (see block 114). The digital data provided on the data path 22 in block 112 may include both digital audio data provided on the audio bus 46 and/or process control data (e.g. parameter data) provided on the parameter bus 48.

As shown at decision block 116, if data on the data path 22 is not associated with the particular processing module 12 to 20, 32, 34, then the data received by the particular module 12 to 20, 32, 34 is merely passed along the data path 22. If, however, the data is associated with the particular module 12 to 20, 32, 34 (e.g. the routing controller 52 has identified that the data is to be routed to the particular processing module 12 to 20, 32, 34), the data (audio data and/or parameter data as the case may be) is extracted from the data path 22 (see block 118). When the extracted data is parameter data, the processing module 12 to 20, 32, 34 uses this data to define the functionality (e.g. algorithm) that it is to execute. When the audio data subsequently arrives, the processing module 12 to 20 processes the audio data to generate processed data (see block 120) that is then provided to the data path 22. Thereafter, the method 110 repeats its monitoring functionality as described herein. It is to be appreciated that any of the methodologies described herein may be provided on any machine-readable medium. Accordingly, the invention extends to a machine-readable medium embodying a sequence of instructions, that when executed by a machine, cause the machine to execute the functionality described herein.

In one embodiment of the invention, the digital processing device 30 is in the form of a VLSI chip. The DSP module 12 may be a 32-bit fixed/floating point DSP that executes four interleaved threads simultaneously. The device 30 may, for example, include one or more of the following:
- ?? 200 MHz internal clock;
- ?? threaded interleaved architecture DSP with 1200 MFLOPS;
- ?? the DSP may dedicate independent DMA controllers to access host memory/SD RAM;
- ?? the delay module 14 may support fractional delay lengths and 1024 memory accesses;
- ?? the mixer module 20 may be a 4096 channel floating-point audio mixer;
- ?? a 5632 channel self ramping parameter generator may be provided;
- ?? the sample rate converter module 16 may be a 256 channel, hybrid sample rate converter;
- ?? the filter module 18 may be a 512 channel second order digital filter;
- ?? the interface module 38 may be a PCI-X interface for interfacing the device 30 to 100 MHz SD RAM interfaces;
- ?? four stereo I$^2$S digital inputs may be provided;
- ?? four stereo I$^2$S digital outputs may be provided;
- ?? four stereo S/PDIF inputs configurable as eight channel C/DIF inputs may be provided;
- ?? four stereo S/PDIF outputs configurable as eight channel C/DIF outputs may be provided;
- ?? PLL slave capability to PS and S/PDIF or C/DIF inputs may be provided;
- ?? 16 independent configurable general purpose input output pins may be provided on the chip; and
- ?? EPROM interfaces for overwriting reset defaults may be provided.

In one embodiment, the device 30 may be connected to a general purpose microprocessor either through the interface module 38 or through an embedded microprocessor bus interface. The microprocessor may control the device 30, for example, through the routing controller 52 which, accordingly, may define a host interface. External SD RAM connected to the audio memory transport module 32 may be provided in certain embodiments. In one embodiment, the audio bus 46 may be sample locked at 48 kHz to each processing module 12 to 20, 32, 34. In one embodiment, the audio bus 46 provides 256 dedicated 32-bit input channels and, accordingly, the data path interface 70 may include 256 32-bit input channels and 256 32-bit output channels. As mentioned above, the output channels may be predefined or dedicated and the input channels may be programmable. As mentioned above, the device 30 may include a linked list 100 and, in one embodiment, the DSP module 12 includes 256 input channels that are mapped to the 4096 channels of the audio bus 46 using the linked list 100. In one embodiment, whenever the DSP module 12 writes to an audio output channel of the audio bus 46 in a given sample period, the audio data written is transferred to the audio bus 46 and an audio ring valid bit may then be set for the particular channel during the next sample period. The parameter bus 48 may provide 256 32-bit input/output channels for parameter passing or routing.

In one embodiment, any input channel or time-slot of the audio bus 46 (regardless of whether it is data used by other modules on the audio bus 46) may be available for use as a sample-locked 32-bit inter-thread data channel visible to all processing modules 12 to 20, 32, 34. This may provide a primary mechanism to the device 30 for passing data between time domain DSP threads located in different processor modules 12 to 20, 32, 34.

When an unused output buffer channel or time-slot is used for inter-thread data passing, the passed data may appear as valid on the audio bus 46 in the time-slot allocated for the particular output buffer channel or time-slot.

Data written to an available input or output audio bus buffer for inter-thread data passing may be immediately visible to all other threads for the remainder of the sample period in which it was written.

Thus, method and device to process digital media streams have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A digital processing device configured to process media data, the device comprising:
    a data path arranged in a ring configuration to transmit at least media data along the data path between a plurality of processing modules integrated within the digital processing device and connected serially such that data is transmitted directly from the output of a first module to an input of a second module of the plurality of processing modules by sequential clocking signals; and
    a routing controller configured to control transmission of data from the first of the plurality of processing modules to any target processing module selected from the plurality of modules by providing an identification for the target processing module in a signal provided on the data path;
    wherein each of the processing modules has a fixed output time slot and a variable input time slot allocated to it, the time allocated to the variable time slot determined by the routing controller.

2. The digital processing device as recited in claim 1 wherein the routing controller controls transmission of data from the first of the plurality of processing modules to any target processing module using time division multiplexed addressing.

3. The digital processing device as recited in claim 1 wherein the data path comprises at least one of an audio bus, a transport bus, and a parameter bus.

4. The digital processing device as recited in claim 1 wherein data path includes a parameter bus which transmits data to be used by a respective one of the plurality of modules to define the functionality of the module.

5. The digital processing device as recited in claim 1 wherein repeated processing by a single module of the plurality is effectuated by allowing the output of a source module of the plurality to be fed to the input of the same module thereby equating the source and target modules.

6. The digital processing device as recited in claim 1 wherein the routing controller provides routing along the data path to processing modules using one of chip select, address, write enable, and write data lines.

7. The digital processing device as recited in claim 1, wherein the data path comprises a total number of time-slots for communicating media data at a plurality of different bit rates such that the sum of a number of time-slots allocated to each one of the plurality of bit rates equals the total number of time-slots.

8. The digital processing device as recited in claim 1, wherein parameters associated with different processing modules are offset by a differing number of time slots such that the parameters are provided in time slots that precede the fixed output time slots of the associated processing modules.

9. The digital processing device as recited in claim 1, wherein the plurality of processing modules are selected from the group consisting of: an audio memory transport module, a delay module, a sample rate converter (SRC) module, a filter module, a mixer module, a digital signal processing (DSP) module, and a digital Input/Output module.

10. The digital processing device as recited in claim 1 wherein the digital processing device is in the form of a chip.

11. A method to process media data with a digital processing device, the method comprising:
    transmitting media data along a data path between a plurality of processing modules integrated within the digital processing device and connected serially such that data is transmitted directly from the output of a first module to an input of a second module of the plurality of processing modules by sequential clocking signals; and
    controlling transmission of data from the first of the plurality of processing modules to any target processing module selected from the plurality of modules by providing an identification for the target processing module in a signal provided on the data path,
    wherein each of the processing modules has a fixed output time slot and a variable input time slot allocated to it.

12. The method as recited in claim 11, wherein controlling transmission of data from the first of the plurality of processing modules to any target processing module comprises:
    using time division multiplexed addressing.

13. The method as recited in claim 11, wherein the data path comprises at least one of an audio bus, a parameter bus, and a transport bus.

14. The method as recited in claim 11, wherein the data path includes a parameter bus which transmits data to be used by a respective one of the plurality of modules to define the functionality of the module.

15. The method as recited in claim 11, further comprising:
    processing repeatedly by a single module of the plurality by allowing the output of a source module of the plurality to be fed to the input of the same module thereby equating the source and target modules.

16. The method as recited in claim 11, further comprising:
    routing along the data path to processing modules using one of chip select, address, write enable, and write data lines.

17. The method as recited in claim 11, wherein the data path comprises a total number of time-slots and wherein transmitting media data comprises:
    transmitting media data at a plurality of different bit rates such that the sum of a number of time-slots allocated to each one of the plurality of bit rates equals the total number of time-slots.

18. The method as recited in claim 11, further comprising:
    offsetting by a differing number of time slots parameters associated with different processing modules such that the parameters are provided in time slots that precede the fixed output time slots of the associated processing modules.

19. A non-transitory computer-readable medium having computer-executable instructions for performing the steps of:
- transmitting media data along a data path between a plurality of processing modules integrated within a digital processing device and connected serially such that data is transmitted directly from the output of a first module to an input of a second module of the plurality of processing modules by sequential clocking signals; and
- controlling transmission of data from the first of the plurality of processing modules to any target processing module selected from the plurality of modules by providing an identification for the target processing module in a signal provided on the data path,
- wherein each of the processing modules has a fixed output time slot and a variable input time slot allocated to it.

20. The non-transitory computer-readable medium as recited in claim 19, wherein controlling transmission of data from the first of the plurality of processing modules to any target processing module comprises:
- using time division multiplexed addressing.

21. The non-transitory computer-readable medium as recited in claim 19, further comprising:
- processing repeatedly by a single module of the plurality by allowing the output of a source module of the plurality to be fed to the input of the same module thereby equating the source and target modules.

* * * * *